United States Patent
Takaiwa

(10) Patent No.: US 9,661,204 B2
(45) Date of Patent: *May 23, 2017

(54) IMAGE CAPTURING APPARATUS AND CONTROL METHOD THEREOF

(71) Applicant: CANON KABUSHIKI KAISHA, Tokyo (JP)

(72) Inventor: Kan Takaiwa, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/845,801

(22) Filed: Sep. 4, 2015

(65) Prior Publication Data

US 2015/0381867 A1 Dec. 31, 2015

Related U.S. Application Data

(63) Continuation of application No. 14/172,333, filed on Feb. 4, 2014, now Pat. No. 9,154,681.

(30) Foreign Application Priority Data

Feb. 18, 2013 (JP) ................................ 2013-029434

(51) Int. Cl.
H04N 5/225 (2006.01)
H04N 5/232 (2006.01)

(52) U.S. Cl.
CPC ....... *H04N 5/2258* (2013.01); *H04N 5/23245* (2013.01)

(58) Field of Classification Search
CPC .................... H04N 5/2258; H04N 5/23245

USPC ............... 348/333.01–333.12, 222.1, 262
See application file for complete search history.

(56) References Cited

U.S. PATENT DOCUMENTS

| | | | |
|---|---|---|---|
| 9,154,681 B2* | 10/2015 | Takaiwa | H04N 5/23245 |
| 2007/0188650 A1* | 8/2007 | Kobayashi | G03B 19/023 |
| | | | 348/344 |
| 2012/0224096 A1* | 9/2012 | Shimoda | G02B 7/36 |
| | | | 348/349 |
| 2012/0300083 A1 | 11/2012 | Funamoto | |
| 2013/0120644 A1* | 5/2013 | Fujii | G02B 7/36 |
| | | | 348/349 |
| 2014/0176785 A1* | 6/2014 | Sambonsugi | H04N 5/23212 |
| | | | 348/350 |

* cited by examiner

*Primary Examiner* — Tuan Ho
*Assistant Examiner* — Marly Camargo
(74) *Attorney, Agent, or Firm* — Cowan, Liebowitz & Latman, P.C.

(57) ABSTRACT

An image capturing apparatus comprises: a first image sensor configured to photo-electrically convert a subject image and output an image signal; a first image processing unit configured to develop a first image signal generated by the first image sensor; a second image processing unit configured to reduce a number of pixels in the first image signal and develop the image signal whose pixels have been reduced as a second image signal; a recording unit configured to record an image signal; and a display unit having a lower pixel count than the pixel count of the first image sensor, wherein in the case where an instruction to capture a still image has been made, the recording unit records the image signal developed by the first image processing unit and the display unit displays the image signal developed by the second image processing unit.

5 Claims, 16 Drawing Sheets

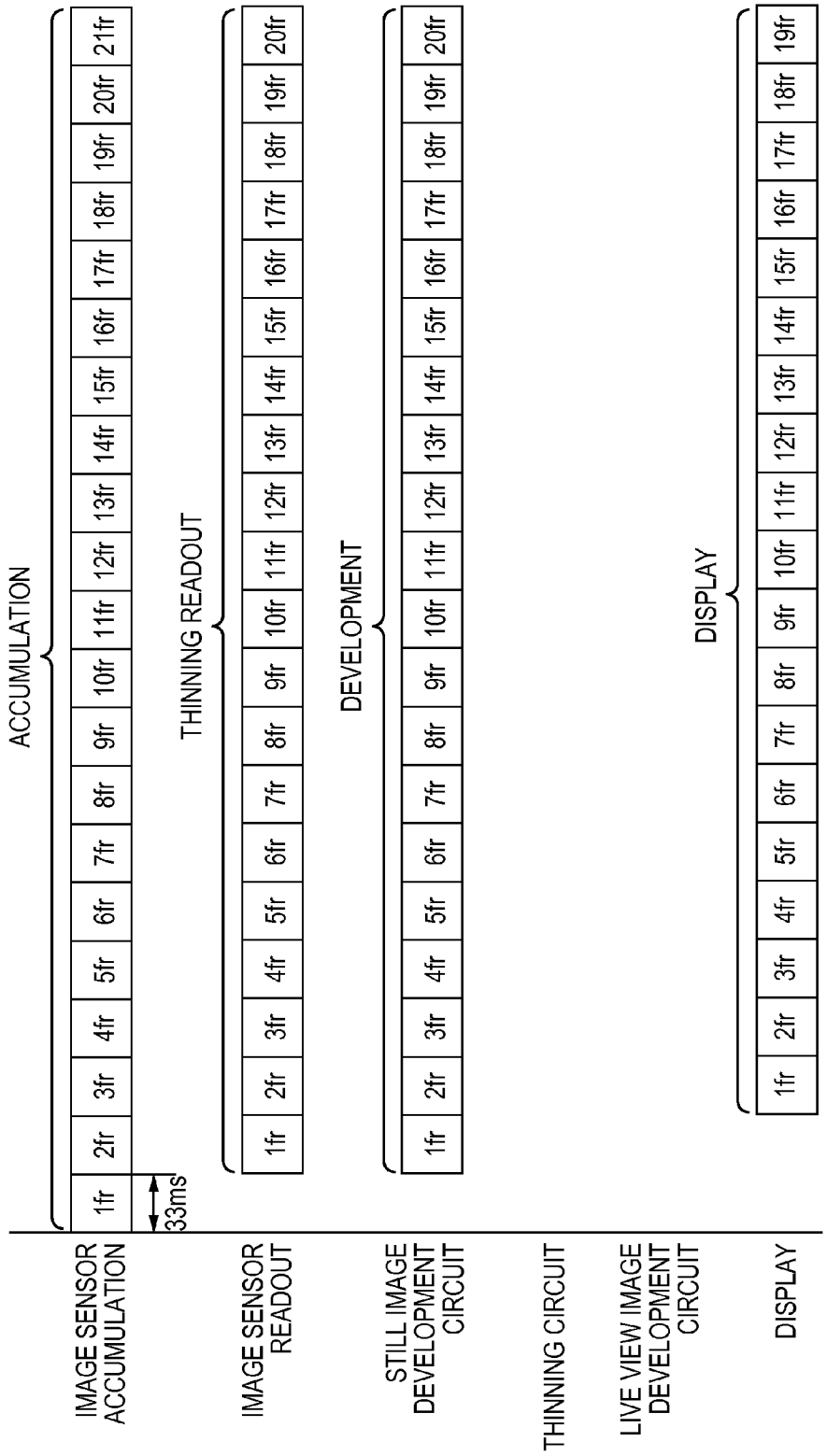

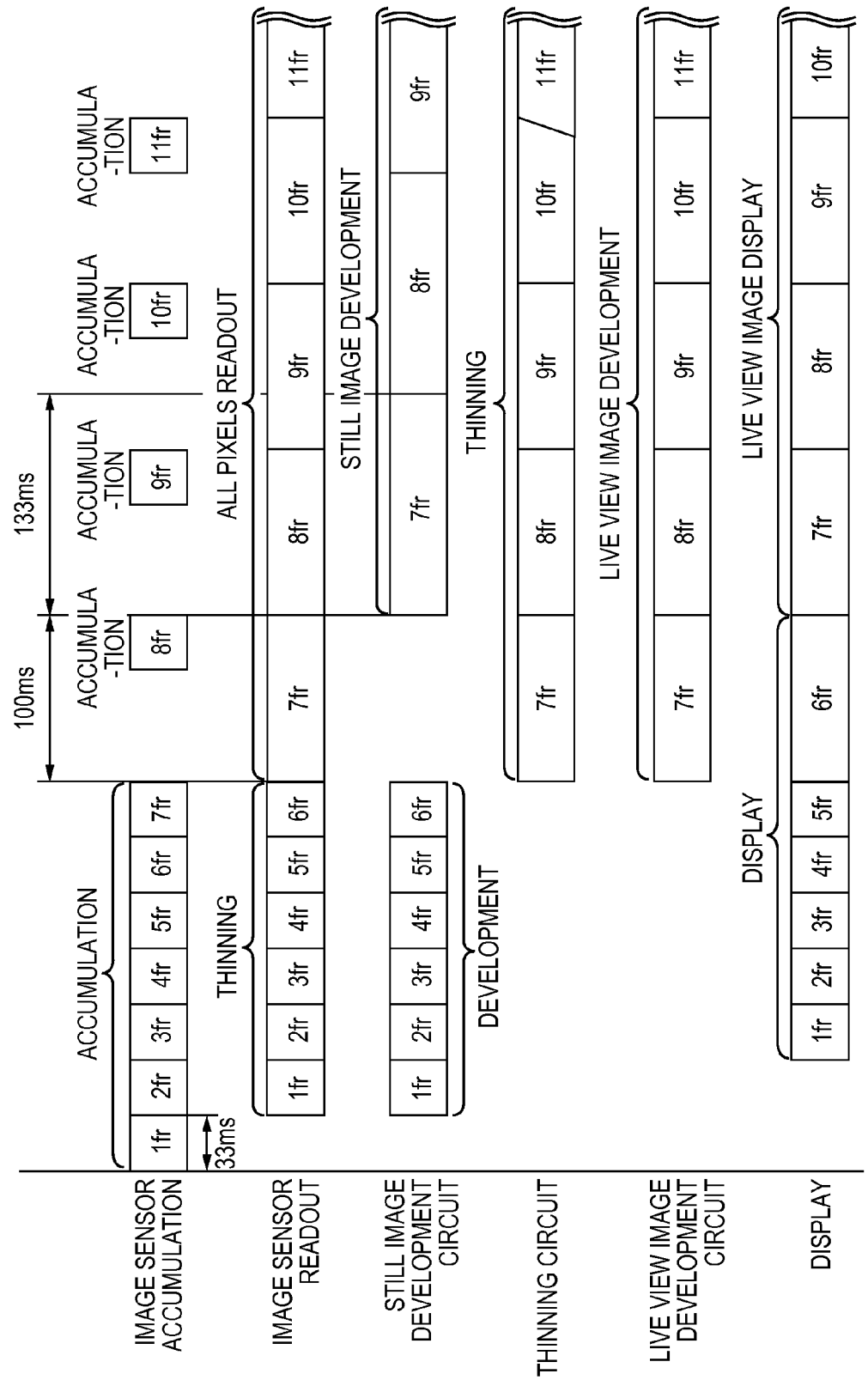

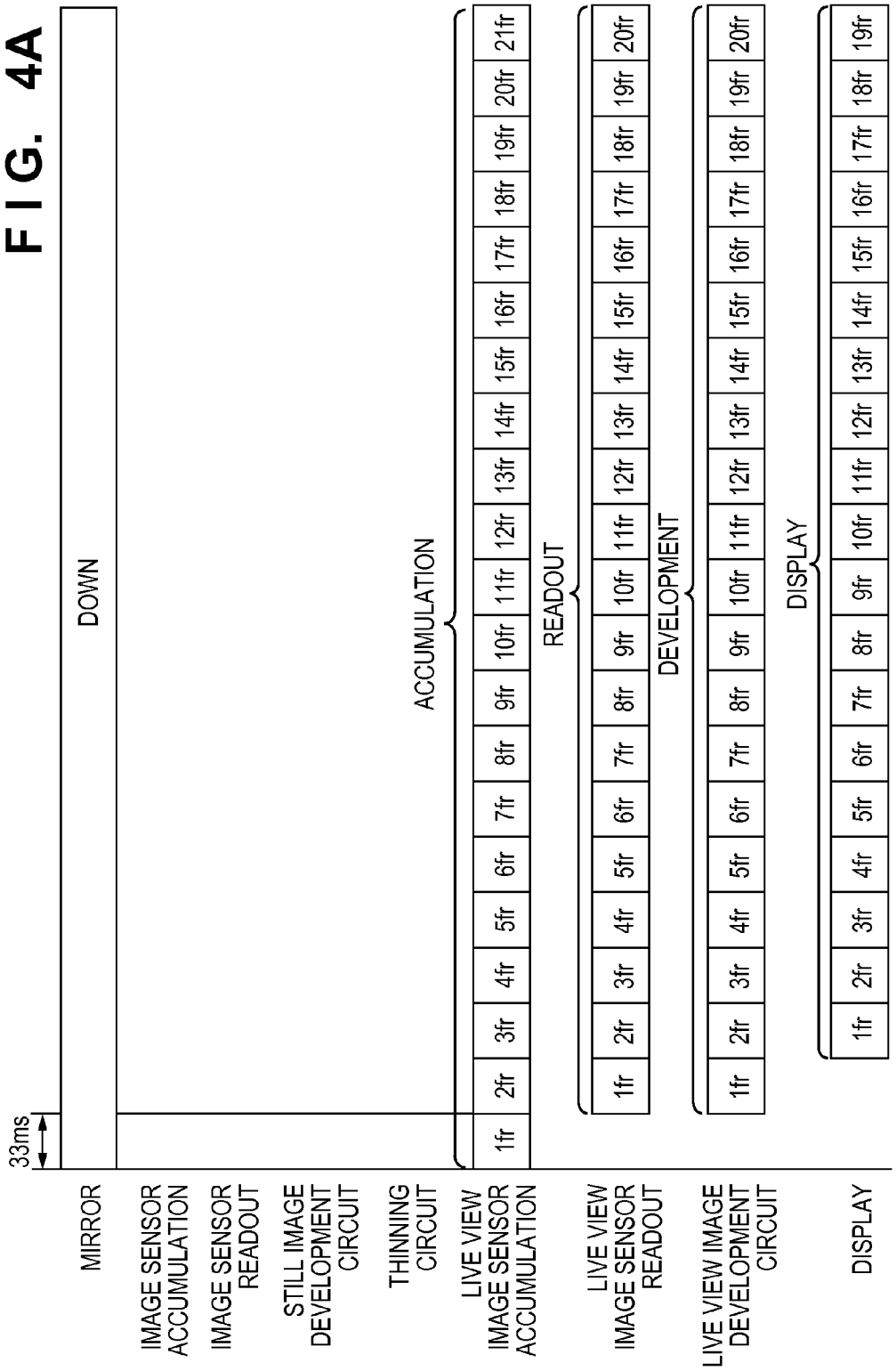

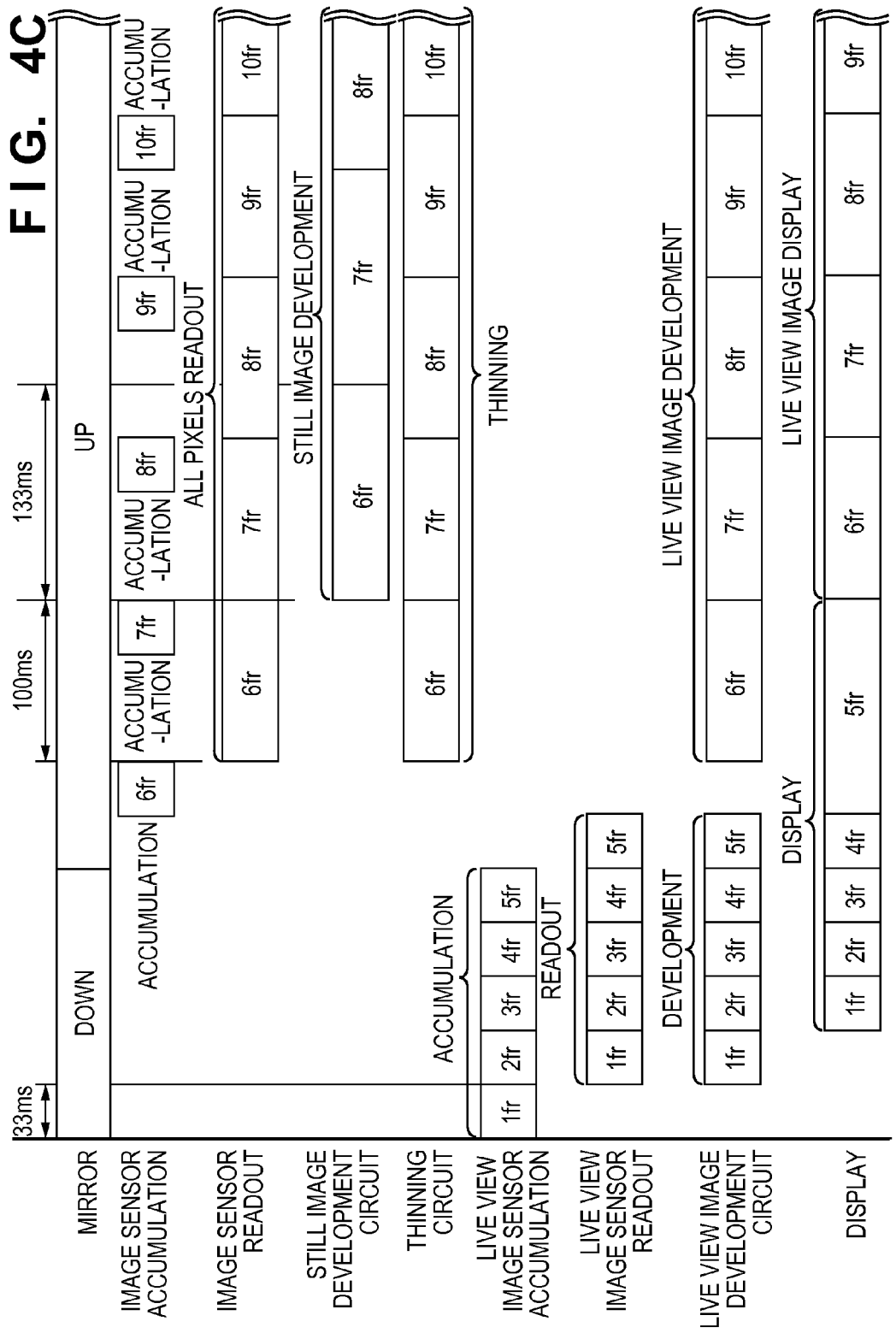

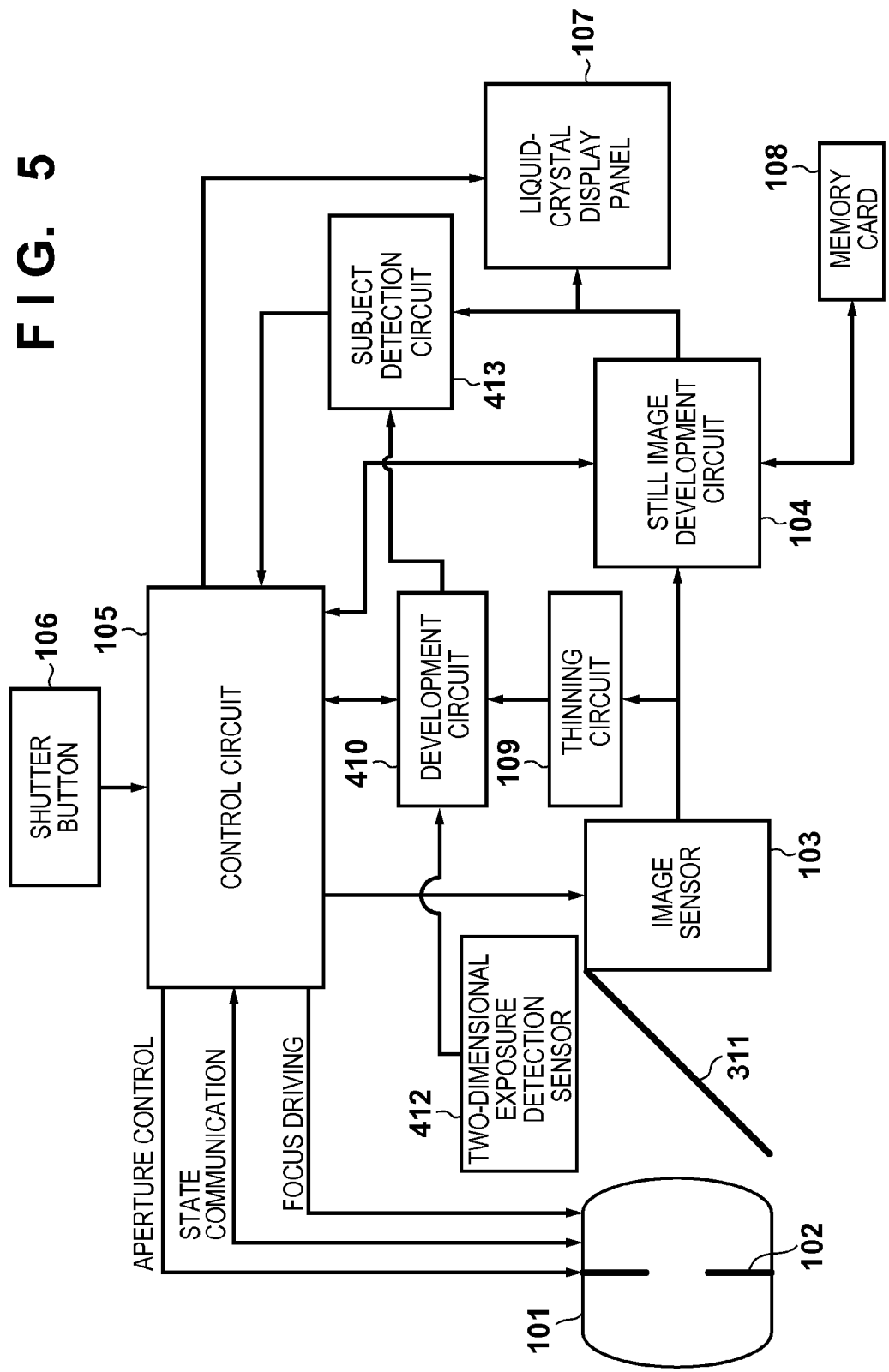

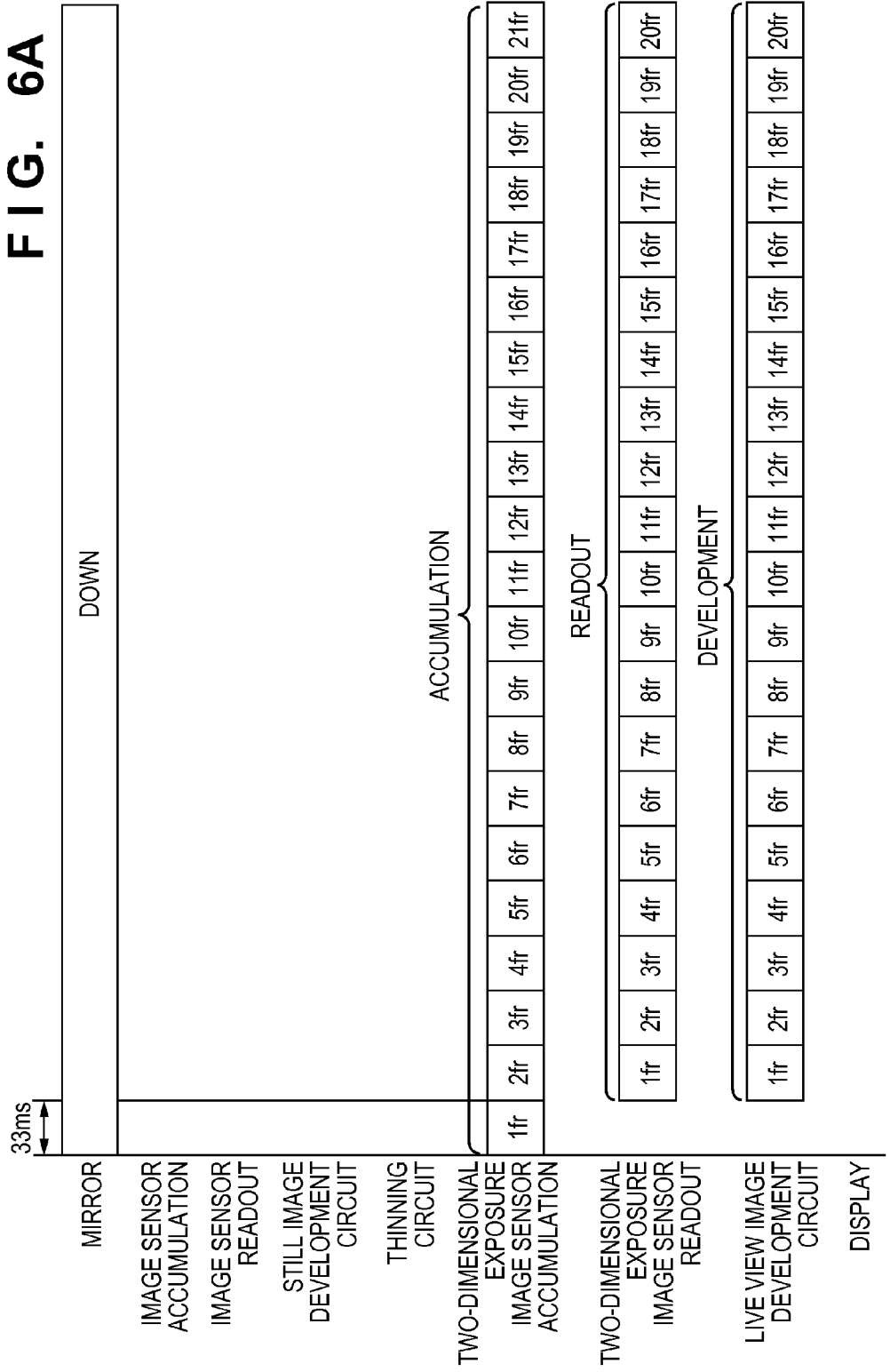

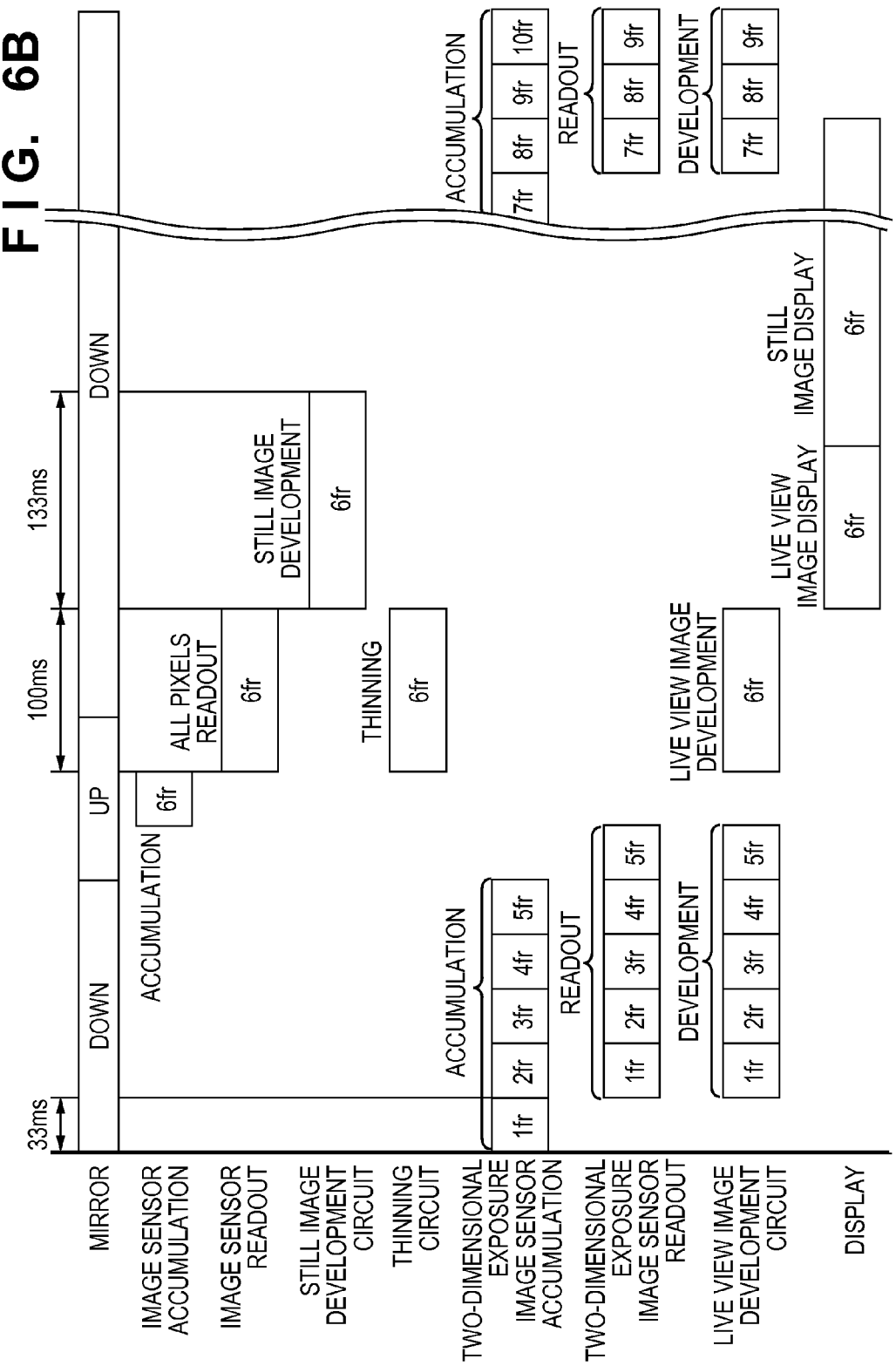

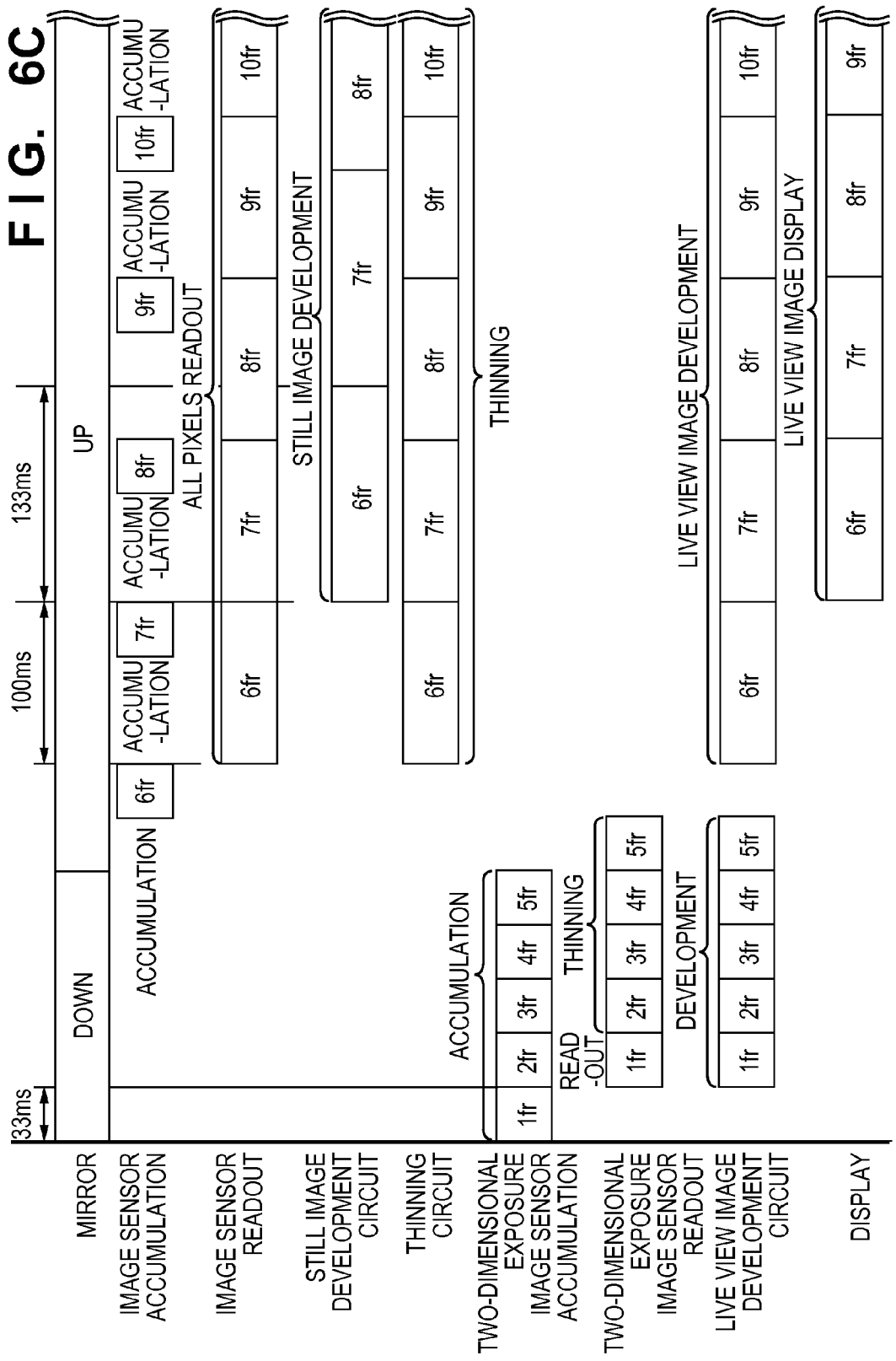

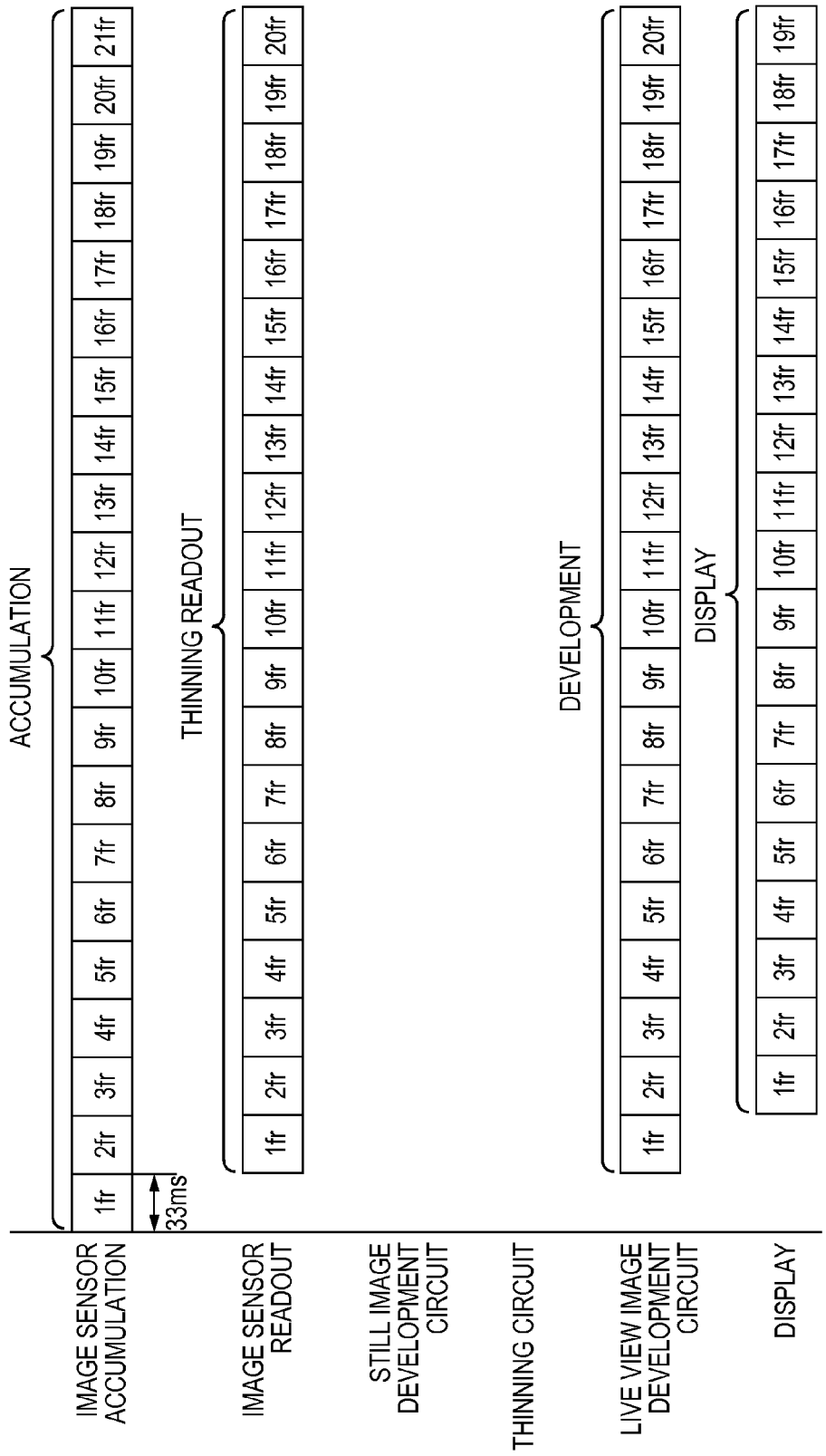

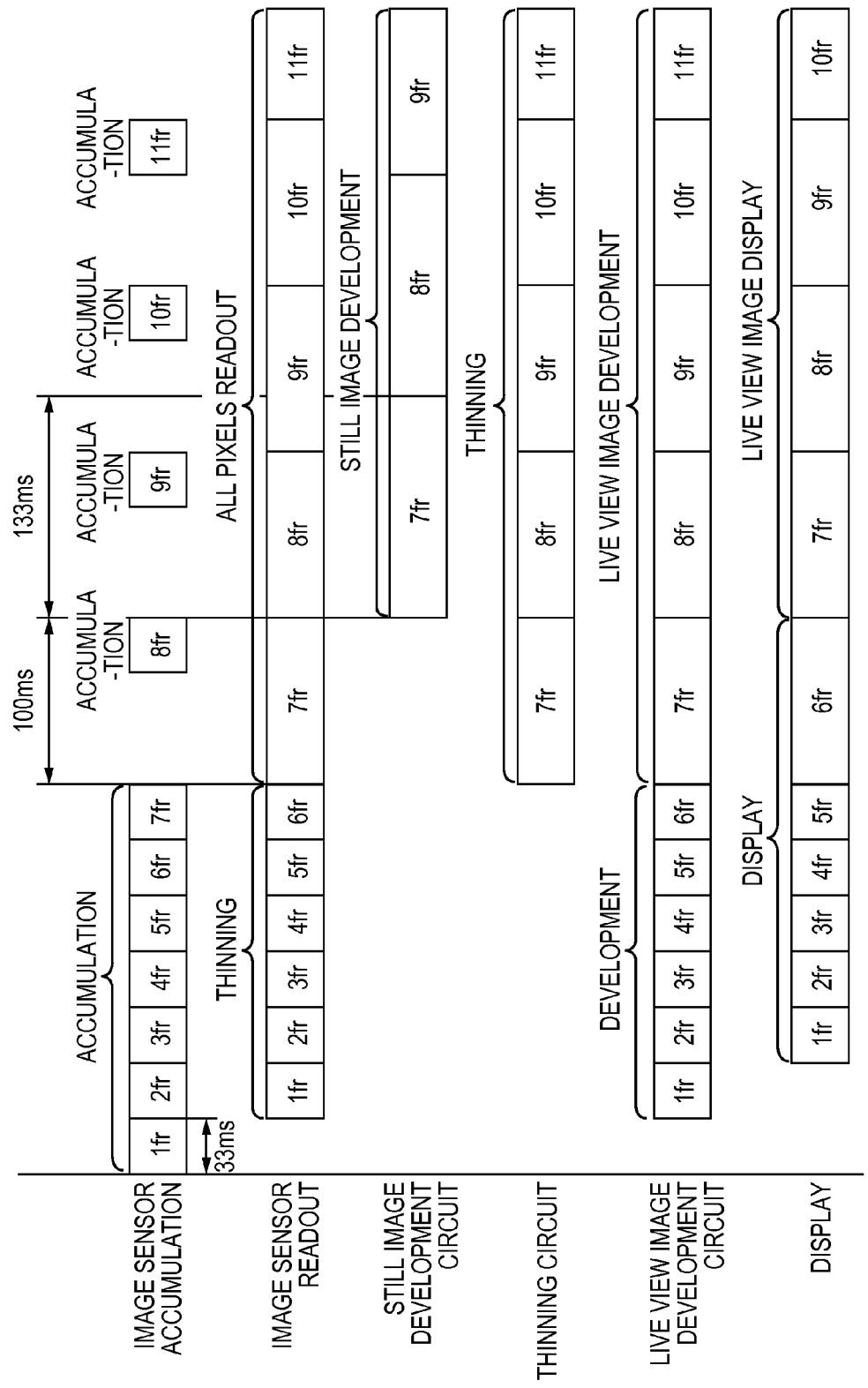

IMAGE CAPTURING APPARATUS AND CONTROL METHOD THEREOF

CROSS-REFERENCE TO RELATED APPLICATIONS

This application is a continuation of application Ser. No. 14/172,333, filed Feb. 4, 2014 the entire disclosure of which is hereby incorporated by reference.

BACKGROUND OF THE INVENTION

Field of the Invention

The present invention relates to image capturing apparatuses and control methods thereof, and particularly relates to image capturing apparatuses, used for shooting still images, that have functions for displaying a live view image that is a moving picture or functions for detecting subjects using moving pictures, as well as to control methods for such apparatuses.

Description of the Related Art

Thus far, image capturing apparatuses for shooting still images have had functions for displaying a subject image obtained by an image sensor as a live view image. For example, a digital camera disclosed in Japanese Patent Laid-Open No. 2001-078072 is provided with a low-pixel count image sensor for capturing a live view image and a moving picture processing circuit in addition to a high-pixel count image sensor for capturing still images, and an output from the image sensor for capturing the live view image is developed by the moving picture processing circuit into an image that is then displayed in a display device.

Meanwhile, in a digital camera device disclosed in Japanese Patent Laid-Open No. 2001-128036, an output from an image sensor used to capture still images is thinned when displaying a live view image, after which live view image data is generated by a live view image processor and displayed in a display device. During continuous shooting, the display of the live view image is prohibited, the live view image is displayed intermittently, or the like in accordance with a mode that has been set.

Furthermore, in a digital camera disclosed in Japanese Patent Laid-Open No. 2002-158901, during continuous shooting, an output from an image sensor used for capturing still images is stored in a buffer memory, resized to a display size, subjected to live view image processing, and displayed.

However, with the conventional technique disclosed in the aforementioned Japanese Patent Laid-Open No. 2001-078072, it is necessary to provide a mechanism that divides an optical path for the image sensor used for capturing still images and the image sensor used for the live view image. In the case where this mechanism is, for example, a movable mirror in a single-lens reflex camera, there is a disadvantage in that the live view image cannot be displayed when the mirror is up during continuous shooting.

Meanwhile, with the conventional technique disclosed in Japanese Patent Laid-Open No. 2001-128036, prohibiting the live view image display during continuous shooting makes it difficult to follow a subject such as when shooting a moving object, whereas it is difficult to view the image being displayed in the case where the live view image is displayed intermittently.

Furthermore, with the conventional technique disclosed in the aforementioned Japanese Patent Laid-Open No. 2002-158901, the output from the image sensor for still images, which is accumulated in a buffer memory when displaying the live view image during continuous shooting, is resized and then processed for live view image display, which results in increased display time lag. There is a further disadvantage in that prioritizing the live view image display processing when the still image development time is not sufficiently low relative to the frame rate will result in the still image development being late.

In addition to the live view image display, a similar problem occurs in a function for detecting a subject from a live view image obtained by an image sensor. A function for detecting the face of a person from an image signal, a function for following a subject by extracting regions of high correlation with regions specified as a subject in later frames, and so on can be given as examples of subject detection functions.

Even if a single-lens reflex camera is provided with an image sensor for capturing still images and an image sensor for detecting a subject, subjects cannot be detected in the case where continuous shooting is carried out with the mirror up. Furthermore, because a lengthy development process is required for image signals obtained by capturing still images, detecting a subject from an image signal obtained by capturing a still image will result in increased time lag until the subject detection result is obtained. It is therefore highly possible that the position of the subject will already have shifted by the time the subject detection result is obtained.

SUMMARY OF THE INVENTION

The present invention has been made in consideration of the above situation, and enables the continuous display of a live view image with a low amount of time lag even during continuous shooting of still images. Alternatively, the present invention enables a subject detection result to be obtained with a low amount of time lag even during continuous shooting of still images.

According to the present invention, provided is an image capturing apparatus comprising: a first image sensor, in which a plurality of pixels are arranged two-dimensionally, configured to photo-electrically convert a subject image and output an image signal; a first image processing unit configured to develop a first image signal generated by the first image sensor; a second image processing unit configured to reduce a number of pixels in the first image signal by performing at least one of addition and thinning on the first image signal and develop the image signal whose pixels have been reduced as a second image signal; a recording unit configured to record an image signal; and a display unit having a lower pixel count than the pixel count of the first image sensor, wherein in the case where an instruction to capture a still image has been made, the recording unit records the image signal developed by the first image processing unit and the display unit carries out a display using the image signal developed by the second image processing unit.

Further, according to the present invention, provided is an image capturing apparatus comprising: a first image sensor, in which a plurality of pixels are arranged two-dimensionally, configured to photo-electrically convert a subject image and output an image signal; a second image sensor, in which a plurality of pixels, a count of which is smaller than that of the first image sensor, are arranged two-dimensionally, configured to output an image signal by photo-electrically converting a subject image and outputting one frame's worth of the image signal at a predetermined cycle; an optical element configured to direct the subject image to one of the first image sensor and the second image sensor; a first image processing unit configured to develop an input image signal; a second image processing unit configured to develop an input image signal; a recording unit configured to record an image signal; a subject detection unit configured to detect a subject from an image signal; and a control unit configured to perform control so that the optical element directs the subject image to the first image sensor and the image signal is output from the first image sensor in the case where an instruction to capture a still image has been made, and perform control so that the optical element directs the subject image to the second image sensor and the image signal is output from the second image sensor in the case where an instruction to capture a still image has not been made, wherein in the case where an instruction to capture a still image has been made, the first image processing unit develops a first image signal generated by the first image sensor, the second image processing unit reduces a number of pixels in the first image signal by performing at least one of addition and thinning on the first image signal and develops the image signal whose pixels have been reduced as a second image signal, the recording unit records the image signal developed by the first image processing unit, and the subject detection unit detects the subject using the image signal developed by the second image processing unit; and in the case where the instruction to capture a still image has not been made, the second image processing unit develops a third image signal output from the second image sensor and the subject detection unit detects the subject using the image signal developed by the second image processing unit.

Furthermore, according to the present invention, provided is a control method for an image capturing apparatus, the apparatus including: a first image sensor, in which a plurality of pixels are arranged two-dimensionally, configured to photo-electrically convert a subject image and outputs an image signal; a first image processing unit configured to develop a first image signal generated by the first image sensor; a second image processing unit configured to reduce a number of pixels in the first image signal by performing at least one of addition and thinning on the first image signal and develop the image signal whose pixels have been reduced as a second image signal; a recording unit configured to record an image signal; and a display unit having a lower pixel count than the pixel count of the first image sensor, and the method comprising: causing the recording unit to record the image signal developed by the first image processing unit and causing the display unit to carry out a display using the image signal developed by the second image processing unit in the case where an instruction to capture a still image has been made.

Further, according to the present invention, provided is a control method for an image capturing apparatus, the apparatus including: a first image sensor, in which a plurality of pixels are arranged two-dimensionally, configured to photo-electrically convert a subject image and outputs an image signal; a second image sensor, in which a plurality of pixels, a count of which is smaller than that of the first image sensor, are arranged two-dimensionally, configured to output an image signal by photo-electrically converting a subject image and outputting one frame's worth of the image signal at a predetermined cycle; an optical element configured to direct the subject image to one of the first image sensor and the second image sensor; a first image processing unit configured to develop an input image signal; a second image processing unit configured to develop an input image signal; a recording unit configured to record an image signal; and a subject detection unit configured to detects a subject from an image signal, and the method comprising: controlling the optical element to direct the subject image to the first image sensor and the image signal to be output from the first image sensor in the case where an instruction to capture a still image has been made, and controlling the optical element to direct the subject image to the second image sensor and the image signal to be output from the second image sensor in the case where an instruction to capture a still image has not been made; in the case where an instruction to capture a still image has been made, causing the first image processing unit to develop a first image signal generated by the first image sensor, causing the second image processing unit to reduce a number of pixels in the first image signal by performing at least one of addition and thinning on the first image signal and develop the image signal whose pixels have been reduced as a second image signal, causing the recording unit to record the image signal developed by the first image processing unit, and causing the subject detection unit to detect the subject using the image signal developed by the second image processing unit; and in the case where the instruction to capture a still image has not been made, causing the second image processing unit to develop a third image signal output from the second image sensor and causing the subject detection unit to detect the subject using the image signal developed by the second image processing unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention;

FIGS. 2A to 2C are timing charts illustrating operations according to the first embodiment;

FIGS. 4A to 4C are timing charts illustrating operations according to the second embodiment;

FIG. 5 is a block diagram illustrating the configuration of an image capturing apparatus according to a third embodiment;

FIGS. 6A to 6C are timing charts illustrating operations according to the third embodiment;

FIGS. 8A to 8C are timing charts illustrating operations according to the fourth embodiment.

DESCRIPTION OF THE EMBODIMENTS

Exemplary embodiments of the present invention will be described in detail in accordance with the accompanying drawings.

First Embodiment

Figure 1:
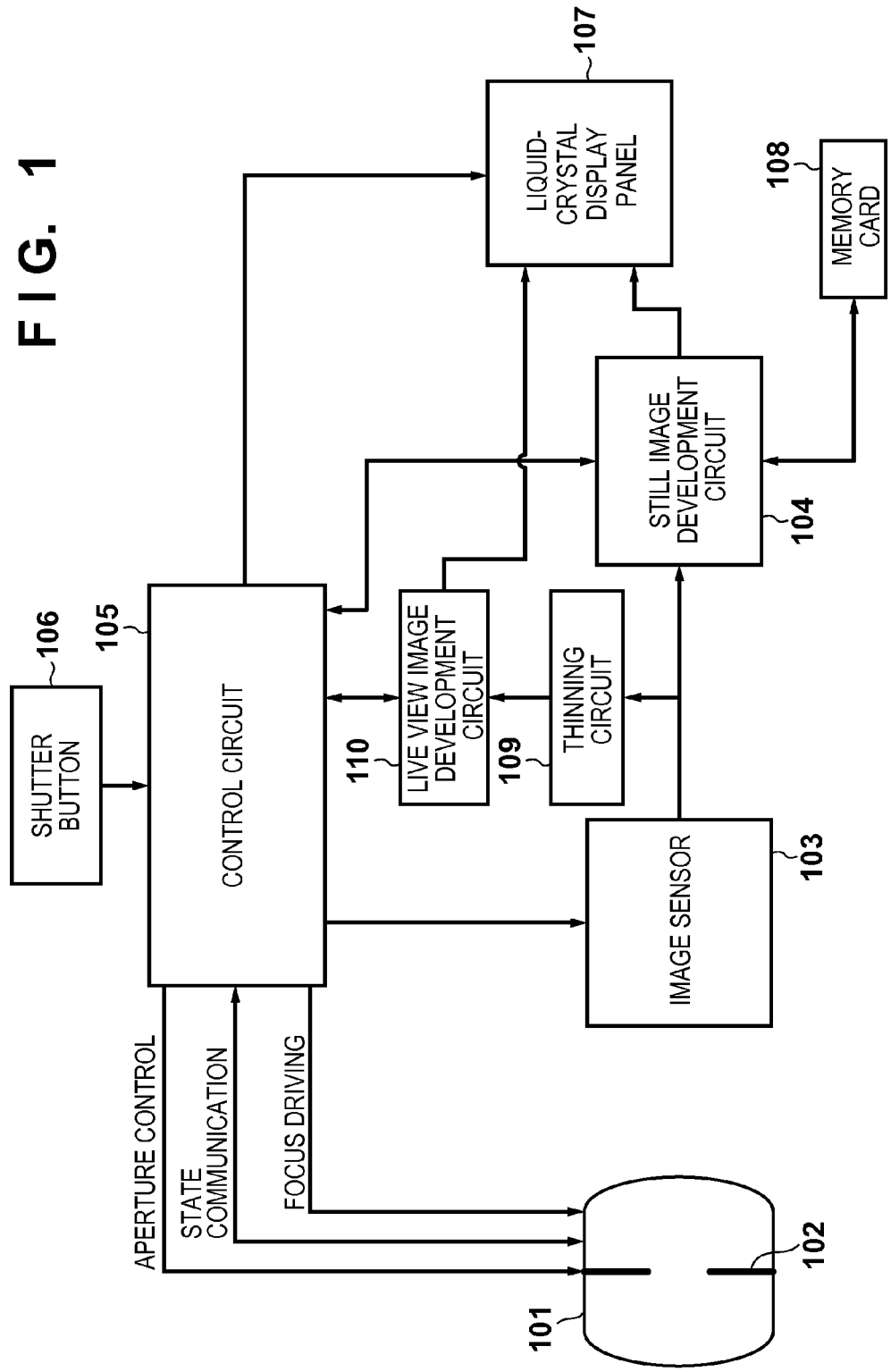
FIG. 1 is a block diagram illustrating the configuration of an image capturing apparatus according to a first embodiment.

FIG. 1 is a block diagram illustrating the configuration of an image capturing apparatus according to a first embodiment of the present invention. As shown in FIG. 1, a subject image (not shown) is formed by a lens unit 101 on an image sensor 103 in which a plurality of pixels are arranged in two dimensions. An aperture mechanism 102 provided in the lens unit 101 is controlled by a control circuit 105 so as to restrict a light flux projected onto the image sensor 103 and achieve an appropriate light amount. Communication indicating a state of a lens, focus driving control, and so on are also carried out between the lens unit 101 and the control circuit 105.

The subject image formed on the image sensor 103 is photo-electrically converted by pixel units in the image sensor 103, and is read out as an electrical signal. The format of the readout from the image sensor 103 differs depending on an operating mode of the image capturing apparatus. For example, in a live view image mode used to determine the focus, exposure, framing, and so on prior to capturing a still image, the plurality of pixels in the image sensor 103 are added or converted into a lower pixel number through thinning, and are then read at a predetermined cycle (for example, 60 frames per second). On the other hand, in a still image capturing mode, all pixels are read out rather than adding or thinning the pixels in order to separately use the data of all of the pixels of the image sensor 103 in the recorded image. When reading out all of the pixels, the frame rate will drop due to the increased number of pixels being read out.

Readout is executed in the live view image mode while a shutter button 106 is not being depressed and when the shutter button 106 is being depressed halfway. The image signal that has undergone adding and/or thinning readout in the live view image mode then undergoes a development process in a still image development circuit 104 and is displayed as a live view image in a liquid-crystal display panel 107. A user can frame his/her shot while viewing this display, and the still image development circuit 104 detects the exposure, the focus state, and so on, after which the readout is executed by the control circuit 105. The control circuit 105 carries out aperture control, focus control, and so on on the lens unit 101 based on various types of detected information read out from the still image development circuit 104.

Next, when the shutter button 106 is fully depressed and the recording of a still image is instructed, the readout is carried out in the still image capturing mode. The image signal read out from all of the pixels is stored in a buffer memory within the still image development circuit 104 and then undergoes a predetermined development process suited to the recording of still images; the image signal then undergoes a compression process and is recorded into a removable memory card 108. Furthermore, in the present first embodiment, the image signal read out from all of the pixels is also used as a live view image, as described hereinafter with reference to FIGS. 2A to 2C.

Figure 2B:
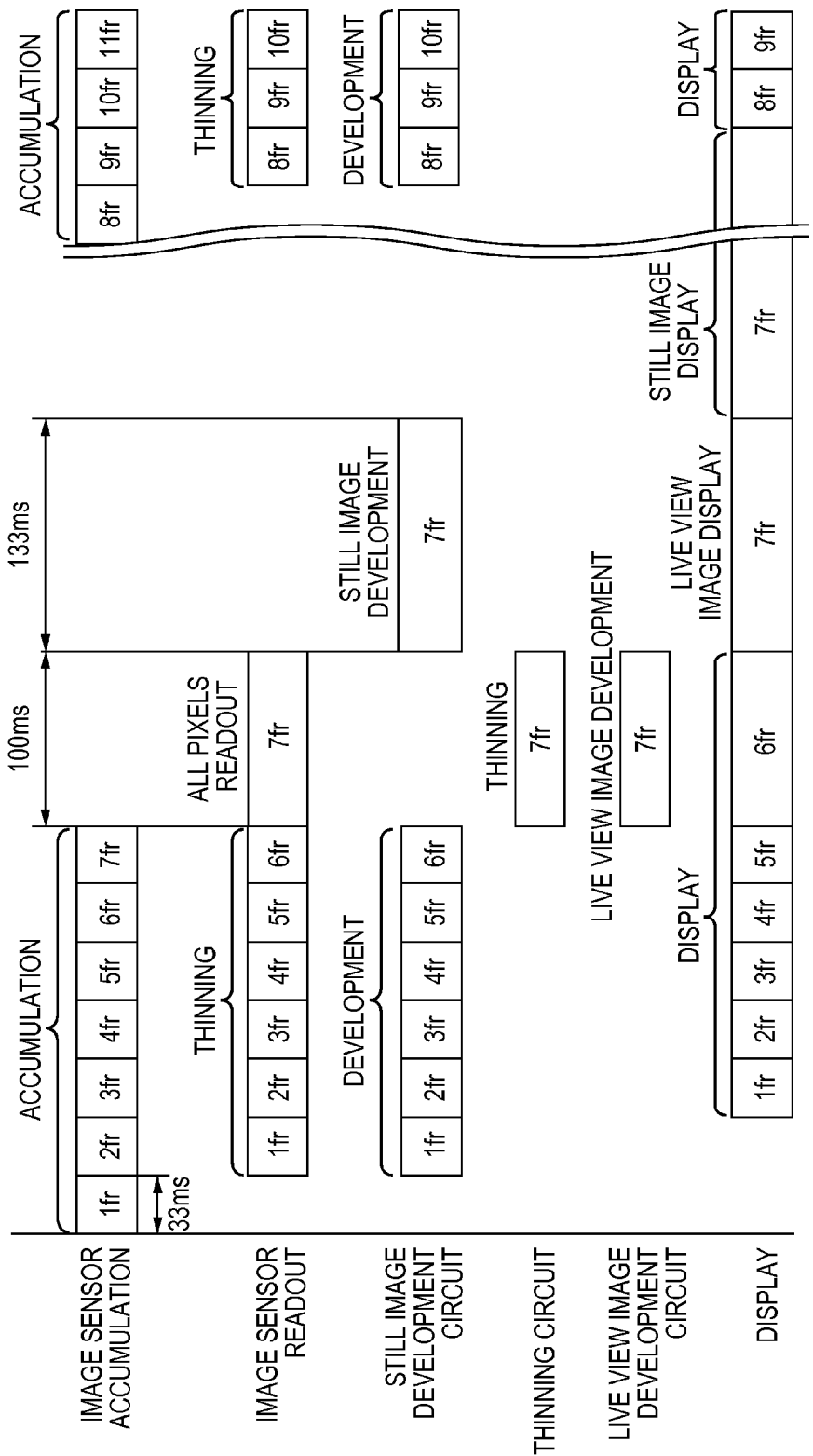

FIGS. 2A to 2C are timing charts illustrating operations performed in the first embodiment. FIG. 2A illustrates operations performed in the live view image mode. In the live view image mode, the image sensor 103 accumulates a charge for a period of 33 ms, and the accumulated charge is added and/or thinned and read out as one frame's worth of an image signal over the 33 ms. Note that a second frame (2fr) is accumulated in parallel with the readout of a first frame (1fr), and an image signal is obtained every 33 ms as a result.

The read-out image signal is displayed in the display panel 107 after undergoing a live view image development process in the still image development circuit 104. The second and subsequent frames undergo the same processing and the live view image is displayed.

FIG. 2B illustrates a timing in the case where a single still image is shot during the live view image display. This example illustrates a case where the shutter button 106 is fully depressed at a seventh frame and a still image is captured.

Here, the operations are the same as those in the live view image mode described above with reference to FIG. 2A from the first frame to a fifth frame. Although the accumulation, readout, and development processes for the sixth frame are the same as those carried out up to the fifth frame, a still image is captured at the following seventh frame, and thus the image signal of the seventh frame cannot be obtained 33 ms after the sixth frame. Accordingly, the live view image at the sixth frame is repeatedly displayed until the live view image at the seventh frame is obtained.

The charge accumulated at the seventh frame is read out in the still image capturing mode. The image signal obtained by reading out all of the pixels undergoes thinning to a size suited for a live view image in a thinning circuit 109, in parallel with the readout; the resulting signal undergoes the live view image development processing in a live view image development circuit 110, and is displayed in the liquid-crystal display panel 107 after the live view image of the sixth frame.

Meanwhile, the image signal of the seventh frame obtained by reading out all of the pixels is stored in the buffer memory within the still image development circuit 104 in parallel with the live view image processing; this signal then undergoes a predetermined development process suited to still image recording (still image development process), undergoes a compression process, and is then recorded into the memory card 108. Further, the image that has undergone the still image development process is displayed in the liquid-crystal display panel 107 after the live view image at the seventh frame, so that the shot can be confirmed.

When the mode is switched back to the live view image mode after a predetermined amount of time has elapsed, the eighth and subsequent frames undergo accumulation, thinning readout, development, and display in the same manner as the frames up to the fifth frame.

FIG. 2C illustrates a timing in the case where still images are continuously shot during the live view image display. This example illustrates a case where the shutter button 106 is fully depressed at a seventh frame and continuous still images are captured.

The same operations as those for the aforementioned live view image mode are carried out from the first frame to the fifth frame. Although the accumulation, readout, and development processes for the sixth frame are the same as those carried out up to the fifth frame, a still image is captured at the following seventh frame, and thus the image signal of the seventh frame cannot be obtained 33 ms after the sixth frame. Accordingly, the live view image at the sixth frame is repeatedly displayed.

The charge accumulated at the seventh frame is read out in the still image capturing mode. The image signal obtained by reading out all of the pixels undergoes thinning to a size suited for a live view image in the thinning circuit 109, in parallel with the readout; the resulting signal undergoes the live view image development processing in the live view image development circuit 110, and is displayed in the liquid-crystal display panel 107 after the live view image of the sixth frame.

Meanwhile, the image signal of the seventh frame obtained by reading out all of the pixels is stored in the buffer memory within the still image development circuit 104 in parallel with the live view image processing; this signal then undergoes a predetermined development process suited to still image recording, undergoes a compression process, and is then recorded into the memory card 108. The case of continuous shooting differs from the case of a single shot in that the image resulting from the processing for still image recording is not displayed in the liquid-crystal display panel 107.

The charge accumulation for the eighth frame is started before the readout for the seventh frame is complete, and is thus completed at the same time as the readout of the seventh frame. The readout for the eighth frame is carried out following the readout of the seventh frame, and the same processing as that performed for the seventh frame is carried out on the image signal obtained by reading out all of the pixels; the live view image at the eighth frame is displayed in the liquid-crystal display panel 107, and the image signal is recorded into the memory card 108. The same processing is carried out for the ninth and subsequent frames, until the shutter button 106 is released.

When the shutter button 106 is released and the mode is switched back to the live view image mode, the following frames undergo accumulation, thinning readout, development, and display in the same manner as the frames up to the fifth frame.

According to the first embodiment, when in the still image capturing mode, the image signal read out from all of the pixels in the image sensor 103 is stored in the buffer memory, developed, and recorded in parallel with a process, performed in the thinning circuit 109, for thinning the pixels to a pixel count suited for the live view image. Note that pixel addition may be carried out instead of or in addition to the pixel thinning. The image signal obtained from the pixel thinning undergoes a predetermined development process suited to a live view image in the live view image development circuit 110, after which the resulting image signal is displayed in the liquid-crystal display panel 107 as a live view image. In the case where the pixel thinning is to be carried out after performing the predetermined development process on the image signal obtained from reading out all of the pixels, the time required for the development process will increase due to the increased number of pixels in the image signal. Accordingly, carrying out pixel thinning on the image signal obtained from reading out all of the pixels before the image signal is input into the still image development circuit 104 and inputting the thinned image signal into the live view image development circuit 110 makes it possible to shorten the amount of time required for the development process. As a result, a live view image having little time lag can be displayed even during continuous shooting of still images. Note that subject detection with little time lag can also be carried out by executing a function for detecting the face of a person from the image signal, a function for following a subject by extracting regions of high correlation with regions specified as a subject in later frames, and so on using the live view image.

Second Embodiment

Figure 3:
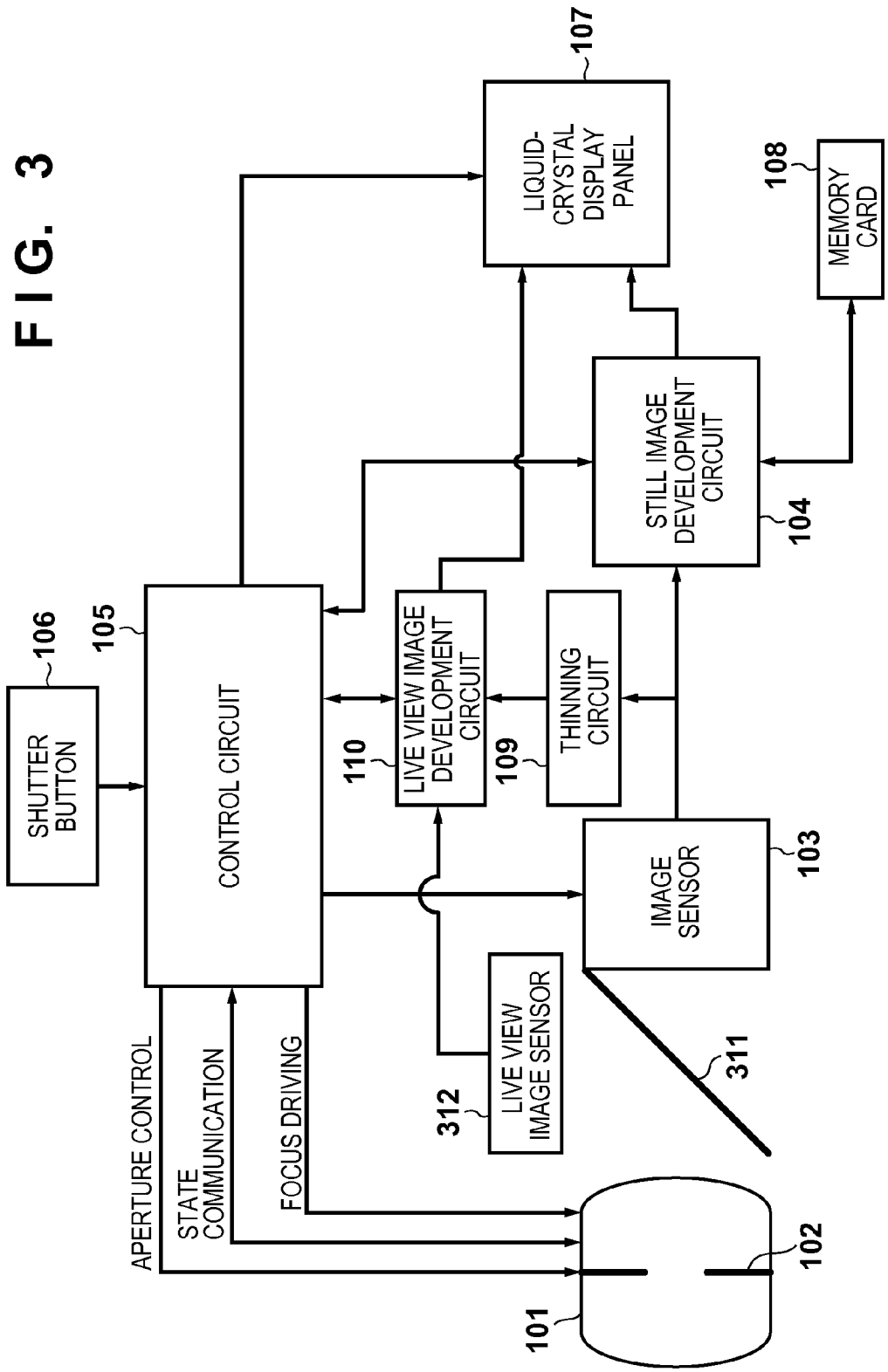
FIG. 3 is a block diagram illustrating the configuration of an image capturing apparatus according to a second embodiment.

Hereinafter, a second embodiment of the present invention will be described. FIG. 3 is a block diagram illustrating the configuration of an image capturing apparatus according to the second embodiment of the present invention. Note that in FIG. 3, constituent elements identical to those in FIG. 1 are given identical reference numerals, and descriptions thereof will be omitted. This configuration differs from that illustrated in FIG. 1 in that a movable mirror 311 and a live view image sensor 312 having a lower pixel count than the image sensor 103 are further provided. Furthermore, in the second embodiment, the live view image sensor 312 is connected to the live view image development circuit 110 in addition to the thinning circuit 109, and the outputs of the thinning circuit 109 and the live view image sensor 312 are selectively input to the live view image development circuit 110.

Operations are executed in a shooting preparation mode while the shutter button 106 is not being depressed and when the shutter button 106 is being depressed halfway. During live view image display in the shooting preparation mode, the movable mirror 311 is inserted into an optical path from the lens unit 101 to the image sensor 103, and a light flux from the lens unit 101 is projected onto the live view image sensor 312. An image signal read out from the live view image sensor 312 undergoes a predetermined development process in the live view image development circuit 110, and is then displayed in the liquid-crystal display panel 107 as a live view image.

On the other hand, when the shutter button 106 is fully depressed and the recording of a still image is instructed, the operations are carried out in a shooting mode. During live view image display in the shooting mode, the movable mirror 311 is withdrawn from the optical path, the light flux from the lens unit 101 is projected onto the image sensor 103, and the light flux no longer reaches the live view image sensor 312. Accordingly, the live view image display operations in the shooting mode are the same as the operations performed in the still image capturing mode according to the first embodiment as described above.

Figure 4B:
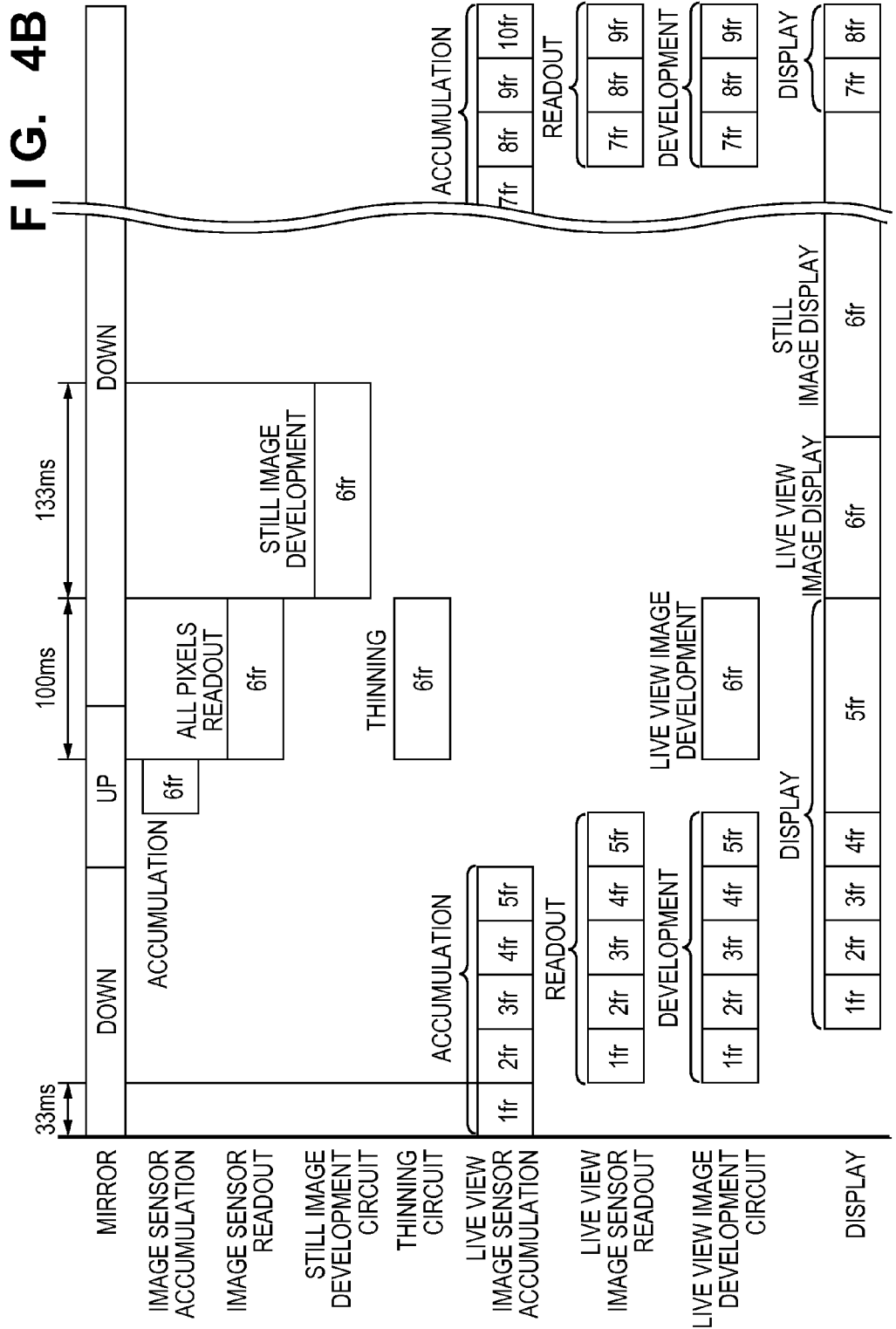

FIGS. 4A to 4C are timing charts illustrating operations performed in the second embodiment. FIG. 4A illustrates operations performed during the live view image display in the shooting preparation mode. In the shooting preparation mode, the movable mirror 311 is down and inserted into the optical path, and thus the light flux from the lens unit 101 is incident on the live view image sensor 312. A charge accumulated in the live view image sensor 312 is read out on a frame-by-frame basis, a development process is carried out by the live view image development circuit 110, and the resulting image signals are displayed sequentially in the liquid-crystal display panel 107. Meanwhile, the image sensor 103, the still image development circuit 104, the thinning circuit 109, and so on for still images are in an idle state.

FIG. 4B illustrates a timing in the case where a single still image is shot during the live view image display in the shooting preparation mode. This example illustrates a case where the shutter button 106 is fully depressed at a fifth frame and a still image is captured. The operations are the same as those in the shooting preparation mode described above with reference to FIG. 4A from the first frame to a fourth frame.

After the accumulation for the fifth frame is complete, the movable mirror 311 withdraws from the optical path and enters a mirror-up state, the charge accumulation by the live view image sensor 312 is stopped, and the image signal of the fifth frame is read out. Although the accumulation, readout, and development processes for the fifth frame are the same as those carried out up to the fourth frame, a still image is captured at the following sixth frame, and thus the next image for live view image display cannot be obtained 33 ms after the sixth frame. Accordingly, the live view image at the fifth frame is repeatedly displayed until the live view image at the sixth frame is obtained.

After the mirror-up state has been completely transited to, the image sensor 103 accumulates the charge for the sixth frame, and the movable mirror 311 transits to the mirror-down state after the accumulation is complete. The image signal of the sixth frame is read out in the still image capturing mode as described in the first embodiment. The image signal obtained by reading out all of the pixels undergoes thinning to a size suited for a live view image in the thinning circuit 109, in parallel with the readout; the resulting signal undergoes the live view image development processing in the live view image development circuit 110, and is displayed in the liquid-crystal display panel 107 after the live view image of the fifth frame.

Meanwhile, the image signal of the sixth frame obtained by reading out all of the pixels is stored in the buffer memory within the still image development circuit 104 in parallel with the live view image processing; this signal then undergoes a predetermined development process suited to still image recording (still image development process), undergoes a compression process, and is then recorded into the memory card 108. Further, the image that has undergone the still image development process is displayed in the liquid-crystal display panel 107 after the live view image at the sixth frame, so that the shot can be confirmed.

When the mode is switched back to the shooting preparation mode after a predetermined amount of time has elapsed, the seventh and subsequent frames undergo accumulation, development, and display in the same manner as the frames up to the fifth frame.

FIG. 4C illustrates a timing in the case where still images are shot continuously during the live view image display in the shooting preparation mode. This example illustrates a case where the shutter button 106 is fully depressed at a fifth frame and continuous still images are captured. The operations are the same as those in the shooting preparation mode described above with reference to FIG. 4A from the first frame to a fourth frame.

After the accumulation for the fifth frame is complete, the movable mirror 311 withdraws from the optical path and enters a mirror-up state, the charge accumulation by the live view image sensor 312 is stopped, and the image signal of the fifth frame is read out. Although the accumulation, readout, and development processes for the fifth frame are the same as those carried out up to the fourth frame, a still image is captured at the following sixth frame, and thus the next image for live view image display cannot be obtained 33 ms after the sixth frame. Accordingly, the live view image at the fifth frame is repeatedly displayed until the live view image at the sixth frame is obtained.

After the mirror-up state has been completely transited to, the image sensor 103 accumulates the charge for the sixth frame. The image signal of the sixth frame is read out in the still image capturing mode as described in the first embodiment. The image signal obtained by reading out all of the pixels undergoes thinning to a size suited for a live view image in the thinning circuit 109, in parallel with the readout; the resulting signal undergoes the live view image development processing in the live view image development circuit 110, and is displayed in the liquid-crystal display panel 107 after the live view image of the fifth frame.

Meanwhile, the image signal of the sixth frame obtained by reading out all of the pixels is stored in the buffer memory within the still image development circuit 104 in parallel with the live view image processing; this signal then undergoes a predetermined development process suited to still image recording, undergoes a compression process, and is then recorded into the memory card 108. The case of continuous shooting differs from the case of a single shot in that the image resulting from the processing is not displayed in the liquid-crystal display panel 107. Furthermore, still images continue to be shot even after the image accumulation of the sixth frame is complete, and thus the movable mirror 311 remains in the mirror-up state.

The accumulation for the seventh frame is started before the readout for the sixth frame is complete, and is thus completed at the same time as the readout of the sixth frame. The readout for the seventh frame is carried out following the readout of the sixth frame, and the same processing as that performed for the sixth frame is carried out on the image signal obtained by reading out all of the pixels; the live view image of the seventh frame is displayed in the liquid-crystal display panel 107, and the image signal is recorded into the memory card 108. The same processing is carried out for the eighth and subsequent frames, until the shutter button 106 is released.

According to the second embodiment described thus far, a live view image having little time lag can be displayed even during continuous shooting when the mirror is up. Furthermore, the amount of power consumed can be suppressed by driving a low-pixel count image sensor during live view image display before and after the shooting and processing only the output of that image sensor using the live view image development circuit. Note that subject detection with little time lag can also be carried out by executing a function for detecting the face of a person from the image signal, a function for following a subject by extracting regions of high correlation with regions specified as a subject in later frames, and so on using the live view image.

Third Embodiment

Next, a third embodiment of the present invention will be described. FIG. 5 is a block diagram illustrating the configuration of a still image capturing apparatus according to the third embodiment of the present invention. Note that in FIG. 5, constituent elements identical to those in FIGS. 1 and 3 are given identical reference numerals, and descriptions thereof will be omitted. The difference from FIGS. 1 and 3 is that an exposure extraction function-added development circuit 410, a two-dimensional exposure detection sensor 412 having a lower pixel count than the image sensor 103, and a subject detection circuit 413 are provided. In the present third embodiment, the two-dimensional exposure detection sensor 412 is connected to the exposure extraction function-added development circuit 410 in addition to the thinning circuit 109, and the outputs thereof are selectively input into the exposure extraction function-added development circuit 410.

Operations are executed in a shooting preparation mode while the shutter button 106 is not being depressed and when the shutter button 106 is being depressed halfway. Prior to the start of still image capturing, the movable mirror 311 is inserted into the optical path from the lens unit 101 to the image sensor 103, and a light flux from the lens unit 101 is projected onto the two-dimensional exposure detection sensor 412. An image signal read out from the two-dimensional exposure detection sensor 412 undergoes a predetermined development process in the exposure extraction function-added development circuit 410, and exposure information is extracted therefrom. The exposure information extracted by the exposure extraction function-added development circuit 410 is supplied to the control circuit 105, and exposure conditions such as an aperture value, an accumulation time, a sensor sensitivity, and so on are determined. The subject detection circuit 413 executes a function for detecting the face of a person from an input image signal, a function for following a subject by extracting regions of high correlation with regions specified as a subject in later frames, and so on.

The two-dimensional exposure detection sensor 412 is a sensor in which priority is given to increasing the dynamic range, as compared to an image sensor used to generate images for display. Accordingly, an image signal generated by the two-dimensional exposure detection sensor 412 is not displayed as a live view image, but can be used in subject detection operations performed by the subject detection circuit 413. In other words, although the live view image cannot be displayed before still image capturing is started, the subject is continuously detected using the two-dimensional exposure detection sensor 412, and thus focus, exposure, and other such settings can be made in accordance with the subject's movement.

On the other hand, when the shutter button 106 is fully depressed and the recording of a still image is instructed, the operations are carried out in a shooting mode. The movable mirror 311 is withdrawn from the optical path, the light flux from the lens unit 101 is projected onto the image sensor 103, and the light flux no longer reaches the two-dimensional exposure detection sensor 412. Accordingly, in the subject detection operations in the shooting mode, an image signal obtained by reading out all of the pixels is first thinned and then undergoes a development process, in the same manner as the operations performed in the still image capturing mode described above in the first embodiment.

FIGS. 6A to 6C are timing charts illustrating operations performed in the third embodiment. Note that the timings illustrated in FIGS. 6A to 6C differ from those illustrated in FIGS. 4A to 4C in that when the movable mirror 311 is down during the shooting preparation mode, a charge is accumulated by the two-dimensional exposure detection sensor 412 instead of the live view image sensor 312. The other timings are the same and thus detailed descriptions thereof will be omitted here.

According to the present third embodiment described thus far, a subject can be detected with little time lag even during continuous shooting when the mirror is up. Furthermore, the amount of power consumed can be suppressed by driving a two-dimensional exposure detection element when detecting the subject before and after the shooting and processing only the output of that detection sensor using the live view image development circuit. Further still, exposure information can be obtained during the shooting preparation mode.

Fourth Embodiment

Figure 7:
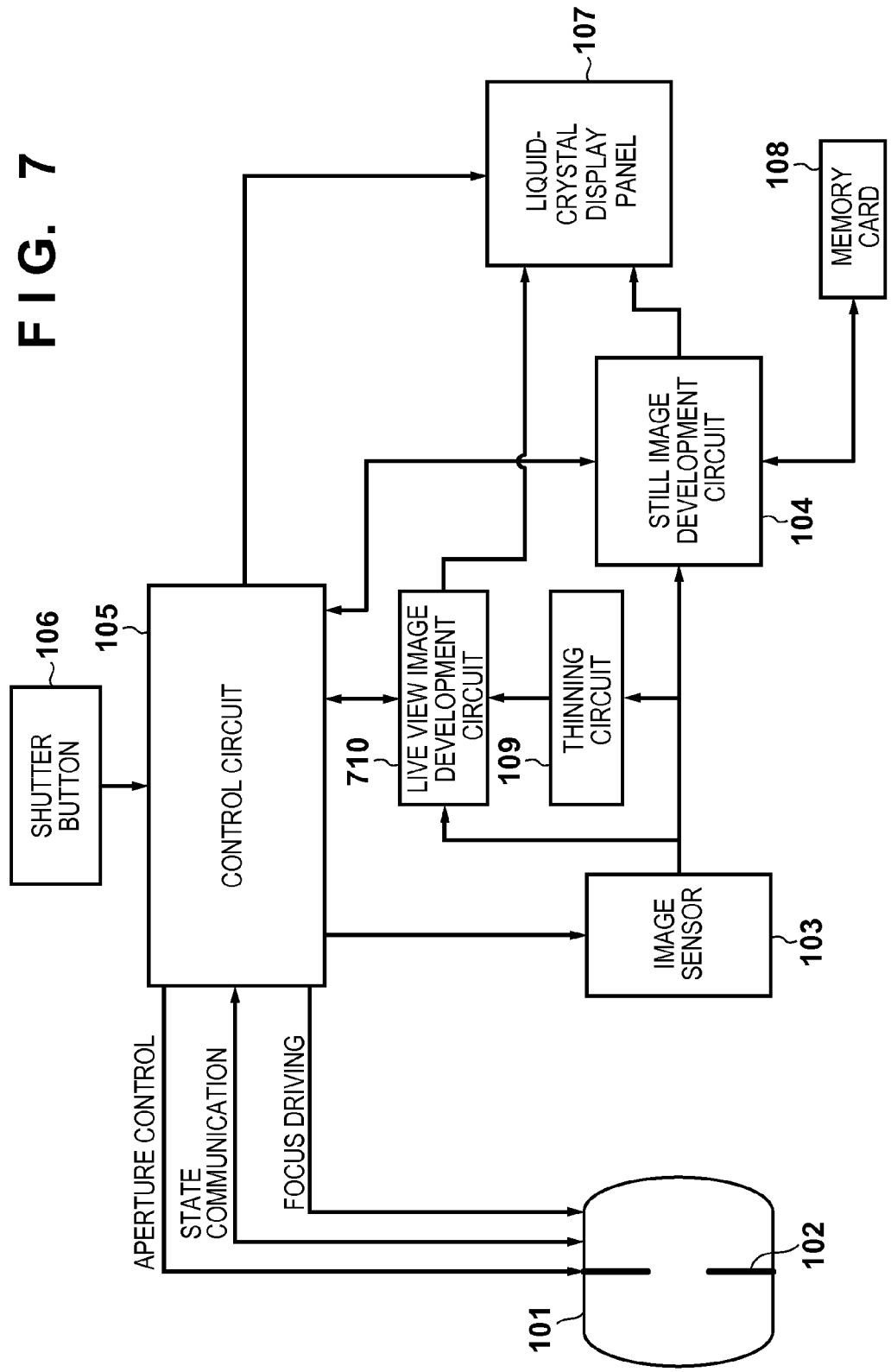
FIG. 7 is a block diagram illustrating the configuration of an image capturing apparatus according to a fourth embodiment.

Hereinafter, a fourth embodiment of the present invention will be described. FIG. 7 is a block diagram illustrating the configuration of a still image capturing apparatus according to the fourth embodiment of the present invention. In FIG. 7, constituent elements identical to those in FIG. 1 are given identical reference numerals, and descriptions thereof will be omitted. The difference from FIG. 1 is that the image sensor 103 is connected to a live view image development circuit 710 according to the fourth embodiment in addition to the thinning circuit 109, and the outputs thereof are selectively input into the live view image development circuit 710.

Readout is executed in the live view image mode while a shutter button 106 is not being depressed and when the shutter button 106 is being depressed halfway. The image signal that has undergone adding and/or thinning readout in the live view image mode is directly input into the live view image development circuit 710, undergoes a development process, and is displayed as a live view image in the liquid-crystal display panel 107. A user can frame his/her shot while viewing this display, and the live view image development circuit 710 detects the exposure, the focus state, and so on, after which the readout is executed by the control circuit 105. The control circuit 105 carries out aperture control, focus control, and so on on the lens unit 101 based on various types of detected information read out from the live view image development circuit 710.

Next, when the shutter button 106 is fully depressed and the recording of a still image is instructed, the readout is carried out in the still image capturing mode. The image signal read out from all of the pixels is stored in a buffer memory within the still image development circuit 104 and then undergoes a predetermined development process suited to the recording of still images; the image signal then undergoes a compression process and is recorded into the memory card 108. Furthermore, in the present fourth embodiment, the image signal read out from all of the pixels is also used as the live view image.

Figure 8B:
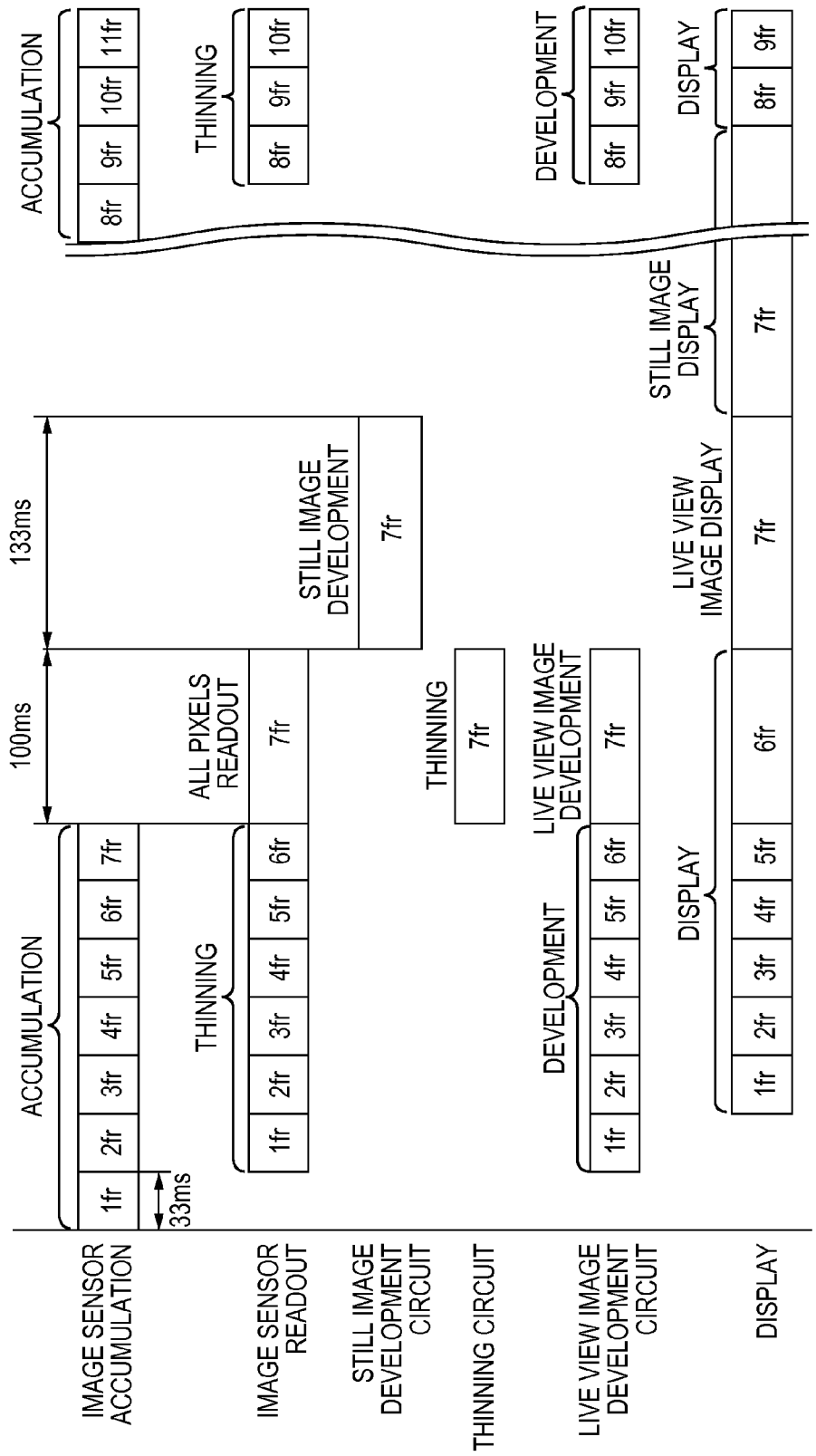

FIGS. 8A to 8C are timing charts illustrating operations performed in the fourth embodiment. FIG. 8A illustrates operations in the live view image mode, FIG. 8B illustrates operations performed when taking a single shot of a still image during live view image display, and FIG. 8C illustrates operations performed when continuously shooting still images during live view image display. The present fourth embodiment differs from the operations described in the first embodiment with reference to FIGS. 2A to 2C in that the development process for the image signal read out from the image sensor 103 during the live view image mode is carried out by the live view image development circuit 710 rather than by the still image development circuit 104. The fourth embodiment is the same as the first embodiment in all other respects, and therefore detailed descriptions thereof will be omitted.

According to the fourth embodiment described thus far, a live view image having little time lag can be displayed even during continuous shooting. Note that subject detection with little time lag can also be carried out by executing a function for detecting the face of a person from the image signal, a function for following a subject by extracting regions of high correlation with regions specified as a subject in later frames, and so on using the live view image.

In addition, an energy conservation state can be achieved in the aforementioned second, third, and fourth embodiments by, for example, turning the supply of power to the still image development circuit 104 off prior to the start of still image capturing, and thus the amount of power that is consumed can be suppressed as well.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-029434, filed on Feb. 18, 2013, which is hereby incorporated by reference herein in its entirety.

What is claimed is:

1. An image capturing apparatus comprising:
a first image sensor, in which a plurality of pixels are arranged two-dimensionally, which outputs a first image signal;
a second image sensor, in which a plurality of pixels, the number of which is smaller than that of the first image sensor, are arranged two-dimensionally, which outputs a second image signal;
an optical element which directs a light flux to the second image sensor;
a first image development circuit which develops the first image signal;
a second image development circuit which develops the second image signal, wherein the developed second image signal is used for detecting a subject;
a memory which records the developed first image signal; and
a display panel which displays an image using the developed second image signal.

2. The capturing apparatus according to claim 1, wherein the display panel displays an image using the developed second image signal in parallel with developing the first image signal.

3. The image capturing apparatus according to claim 1, wherein the number of pixels of the display panel is smaller than the number of pixels of the first image sensor.

4. The image capturing apparatus according to claim 1, wherein the memory records the developed first image signal in a case where an instruction to capture a still image has been made.

5. A control method for an image capturing apparatus, the apparatus including:
a first image sensor, in which a plurality of pixels are arranged two-dimensionally, which outputs a first image signal; and
a second image sensor, in which a plurality of pixels, the number of which is smaller than that of the first image sensor, are arranged two-dimensionally, which outputs a second image signal;
an optical element which directs a light flux to the second image sensor; and
a display panel,
the method comprising:
developing the first image signal;
developing the second image signal;
recording the developed first image signal;
detecting a subject from the developed second image signal; and
displaying an image on the display panel using the developed second image signal.

* * * * *